PARTY LINE SELECTIVE SIGNALLING SYSTEM HAVING CODE CALL

Filed Sept. 25, 1951 4 Sheets-Sheet 1

INVENTOR.
ROY W. JONES
BY Wm. Walter Owen
ATTORNEY

INVENTOR.
ROY W. JONES
BY Mc Walter Owen.
ATTORNEY

INVENTOR.
ROY W. JONES
BY Wm. Walter Owen.
ATTORNEY

INVENTOR.
ROY W. JONES
BY Mc Walter Owen
ATTORNEY

United States Patent Office 2,735,892

Patented Feb. 21, 1956

2,735,892

PARTY LINE SELECTIVE SIGNALLING SYSTEM HAVING CODE CALL

Roy W. Jones, Rochester, N. Y., assignor to Automatic Electric Laboratories, Inc., Chicago, Ill., a corporation of Delaware Application September 25, 1951, Serial No. 248,224

6 Claims. (Cl. 179—18)

This invention relates to automatic telephone systems in general, but is concerned more particularly with small systems of the type which are commonly known as private automatic exchanges, or as a P. A. X. Exchanges of this nature are usually installed by private concerns and in order to meet the more exacting requirements of the subscriber in these small systems, it is often necessary to provide certain special features which are unnecessary in a large public exchange. The present invention is concerned with certain of said special features commonly known as code-call and executive right-of-way.

The principal object of the present invention is to provide the above named features without materially increasing the cost of the equipment, while retaining simple, reliable, efficient and modern high-class telephone service.

A feature of the invention relates to certain new and improved circuit arrangement, whereby, code-call, executive right-of-way and local-to-local service are provided satisfactorily.

Another feature relates to the code-call service, whereby the code-call equipment is seized responsive to the operation of a push button at a subscribers' station. The local link is then released and responsive to dial tone being received from the code-call equipment, the desired code-call number is dialled and a minor switch in the code-call equipment is operated responsive to the dialling. The dialled code-call number is stored in a first and second group of storage relays. The code-call equipment is then operated to transmit a series of signalling pulses for subsequent operation of the code sounders.

Other features, together with the ones named above, will be explained more in detail hereinafter, references being had with the accompanying drawings which show by means of the usual circuit diagrams a sufficient amount of the apparatus to enable the invention to be described and understood.

Referring now to the drawings of Figures 1 through 5 inclusive: Figure 1 shows two lines such as L4 and L13 with each line shown as a party line and having subscribers A, B, C and D respectively. Each subscribers' station consists of the usual and well-known equipment common to automatic systems, therefore only the ringers at each station have been shown, and these are connected to opposite sides of the lines. Each line contains an individual line and cut-off relay which tends to operate as a two-step relay, with the first step being that of an ordinary line relay and the second step being that of a cut-off relay. The finder portion of one of the finder-connector links is shown, as well as the first relays of the call allotter. Subscriber C is assumed to be an executive and is therefore shown as having a push button 185 which provides the executive with the special service of executive right-of-way. The push button 185 will also provide subscriber C with the special service feature of being able to originate a code-call. In addition, connections are also shown connecting the executive's line to an executive's loudspeaker system such as disclosed in U. S. Patent Number 2,224,477, issued December 10, 1940, to Roswell H. Herrick. The finder comprises a rotary switch, having contact banks of 26 contacts each, for terminating the line conductors, control conductors, extra control conductors, a conductor from the code-call equipment and a conductor from the connector portion of the links. The last, or 26th contact of each bank may be used as a normal, or home position.

Figure 1:
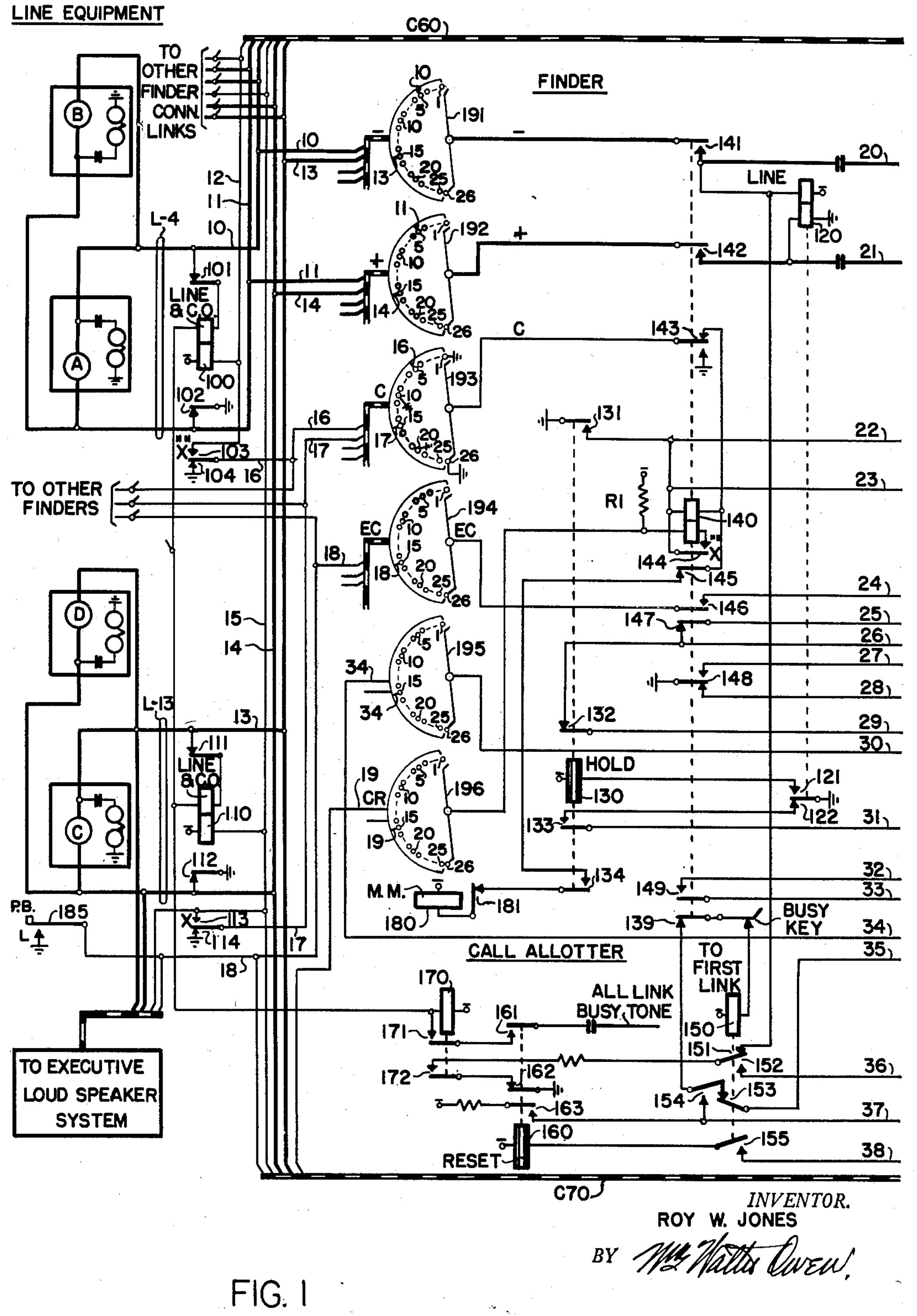
Figure 2:
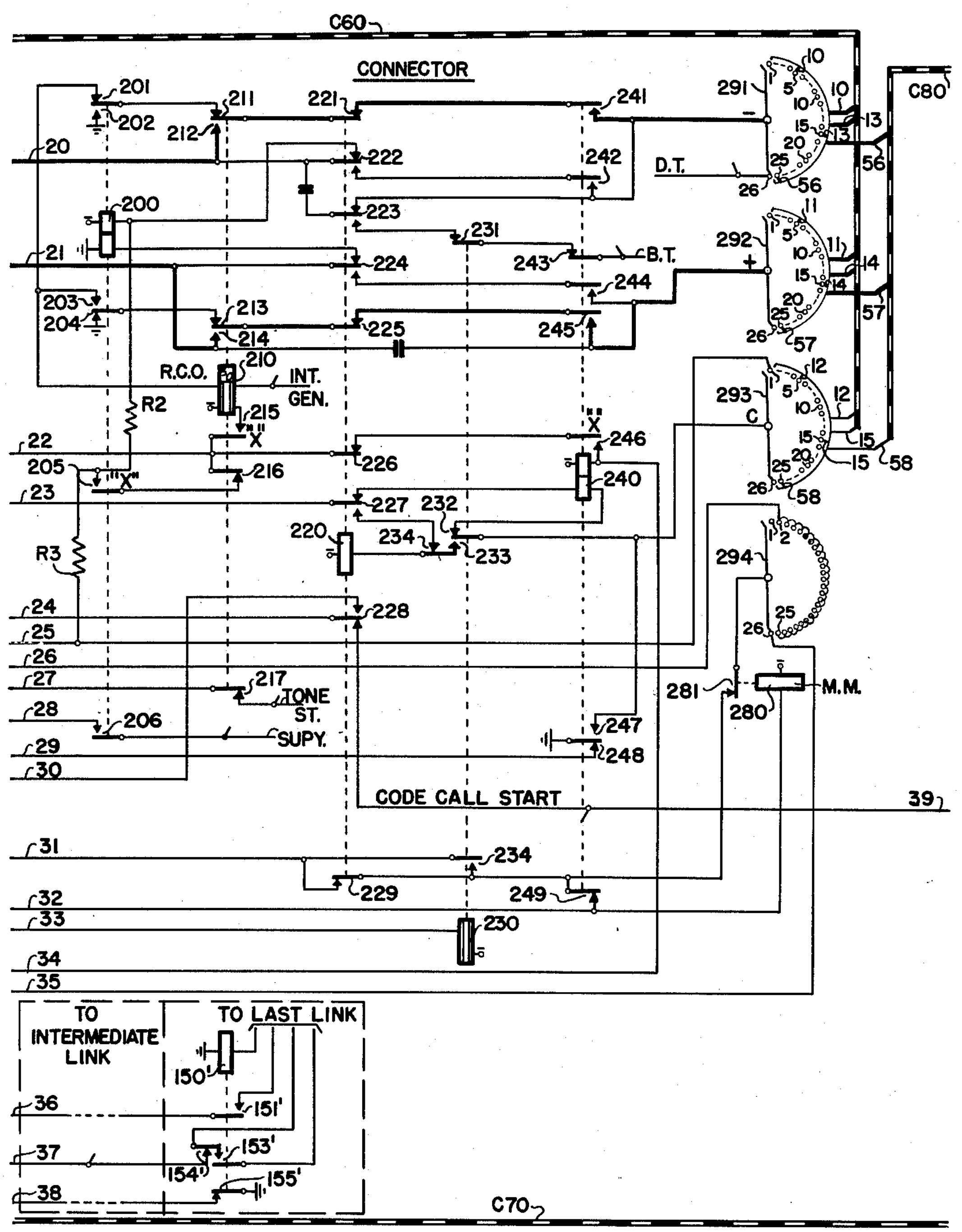
Figure 2 shows the connector portion of one of the finder-connector links, with the connector also using a rotary switch of the same type and construction as disclosed in the finder.

Referring more particularly to Figures 1 and 2 of the drawings it will be noted that the first, tenth and twentieth contacts in each bank except one bank in each of the finder switches are not used, and the tenth and twentieth contacts, of the bank having the C conductors connected thereto, are connected to ground. It will be seen that the system can serve a maximum of 21 two-party lines with an additional contact in the rotary switch connector banks being used as a code-call answer number. It will also be noted that one, two, three and four digit call numbers are provided. The following table has been inserted to show the relationship between the switch bank terminals and the call numbers of each line.

Table I

| Switch Bank-Terminal Number | Call Numbers: First Party | Call Numbers: Second Party | Line Number |
|---|---|---|---|
| 1 | Not Used | Not Used | |
| 2 | 2 | 11 | L1 |
| 3 | 3 | 12 | L2 |
| 4 | 4 | 13 | L3 |
| 5 | 5 | 14 | L4 |
| 6 | 6 | 15 | L5 |
| 7 | 7 | 16 | L6 |
| 8 | 8 | 17 | L7 |
| 9 | 9 | 18 | L8 |
| 10 | Not Used | Not Used | |
| 11 | 01 | 191 | L9 |
| 12 | 02 | 192 | L10 |
| 13 | 03 | 193 | L11 |
| 14 | 04 | 194 | L12 |
| 15 | 05 | 195 | L13 |
| 16 | 06 | 196 | L14 |
| 17 | 07 | 197 | L15 |
| 18 | 08 | 198 | L16 |
| 19 | 09 | 199 | L17 |
| 20 | Not Used | Not Used | |
| 21 | 001 | 1901 | L18 |
| 22 | 002 | 1902 | L19 |
| 23 | 003 | 1903 | L20 |
| 24 | 004 | 1904 | L21 |
| 25 | 005 (Code Call Ans.) | Not Used | |
| 26 | Normal | Normal | |

In referring to Table I, it will be seen that the first terminals of the connector switch banks are not used for a line and that the second through the ninth terminals serve lines L1 through L8 respectively. The tenth terminals of the switch banks are not used and the eleventh through nineteenth terminals serve lines L9 through L17 respectively. The twentieth contacts are not used, and the twenty-first through twenty-fourth contacts serve lines L18 through L21 respectively. The twenty-fifth terminal of the connector is used for answering code-calls, and the twenty-sixth terminals of the switch banks serve as the home position for the switch wipers. From the table it will be noted that a prefix digit 1 is used when calling the second parties of each of the lines. From the table it will be noted that the illustrated lines L4 and L13 are connected to the switch terminals 5 and 15 respectively, and that the call numbers of the first and second parties on line L4 are 5 and 14 and the call numbers of the first and second parties on line L13 are 05 and 195 respectively.

It will be noted that the present disclosure is similar to that of my co-pending application filed December 30, 1947, Serial No. 794,482, now U. S. Patent 2,571,250 issued October 16, 1951, but having the finder connector links modified to accommodate a P. A. X serving only 21 lines and having the code-call equipment modified to include a minor switch having only two wipers and sets of banks of contacts.

The call allotter shown in Figures 1 and 2 is of the all-relay preselecting type, in that each time a call is initiated and received, the next idle relay set in succession is used to start an idle finder of a link hunting for the calling line. After the last link in the group has been used, a chain circuit is completed to the reset relay such as 160, which operates and completes a circuit to all the relays corresponding to 150 and 150' of the idle relay sets, thus making the links preselectable to start their associated finders to hunt for the calling lines as the links are again used in succession.

The rotary switch of the illustrated finder is of the non-numerical type and is non-homing, whereas, the rotary switch of the illustrated connector is of the numerical type and restores to its home position each time after the finder-connector is used. It will be noted that 25th terminals of the connector switch contact banks are used as the code-call answering terminals.

Referring to Figure 2, it will be noted that the battery-feed and ring-reversal relay such as 200 serves two definite purposes; first, it provides talking battery potential for the called party, and second, it routes ringing current over the opposite line conductor when the second party on a line is called.

Figures 3, 5:
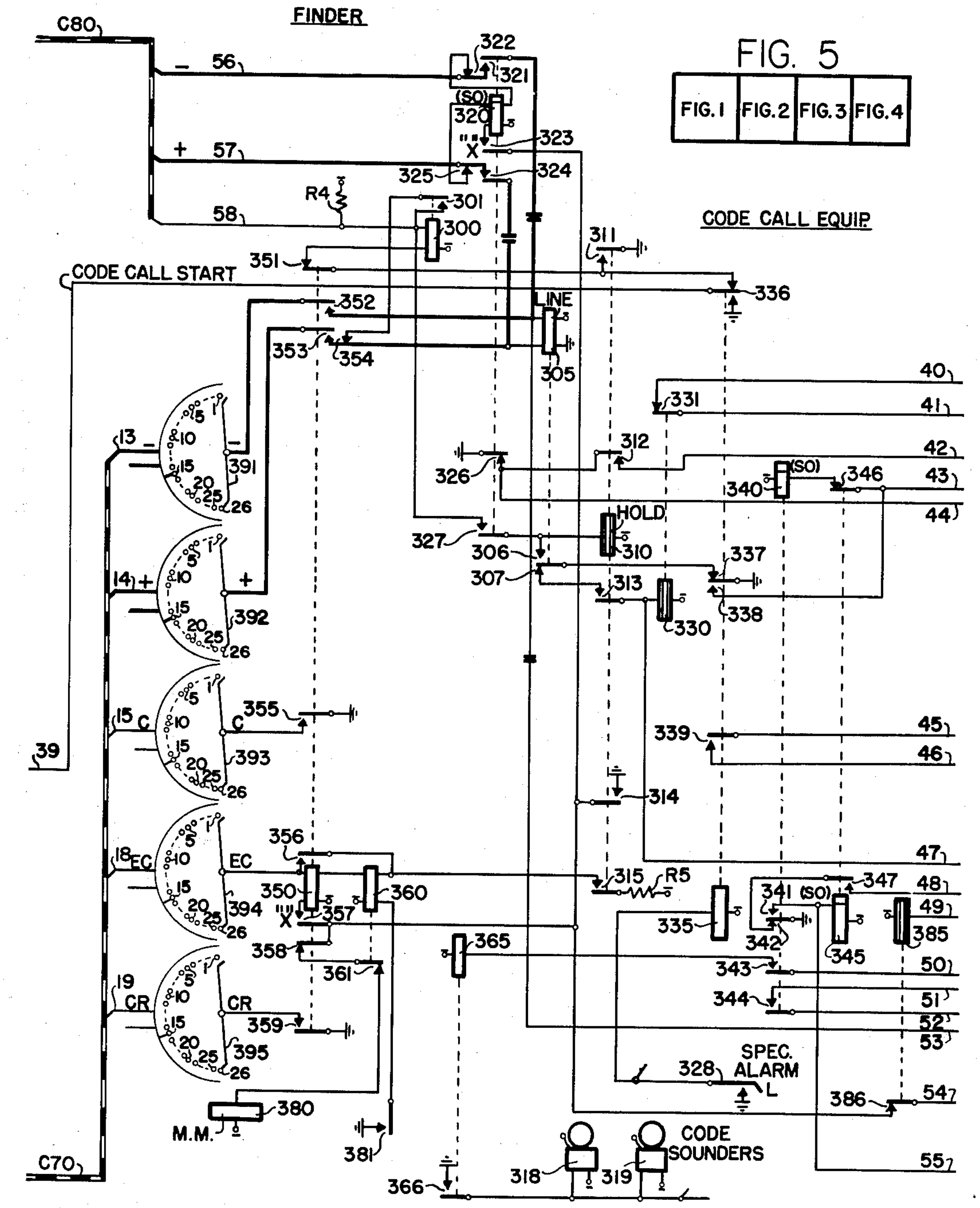
Figure 3 shows the finder portion, or code-call finder, and the code sounding apparatus of the code-call equipment.
Figure 5 is a diagram showing how the drawings should be arranged.
Figure 4:
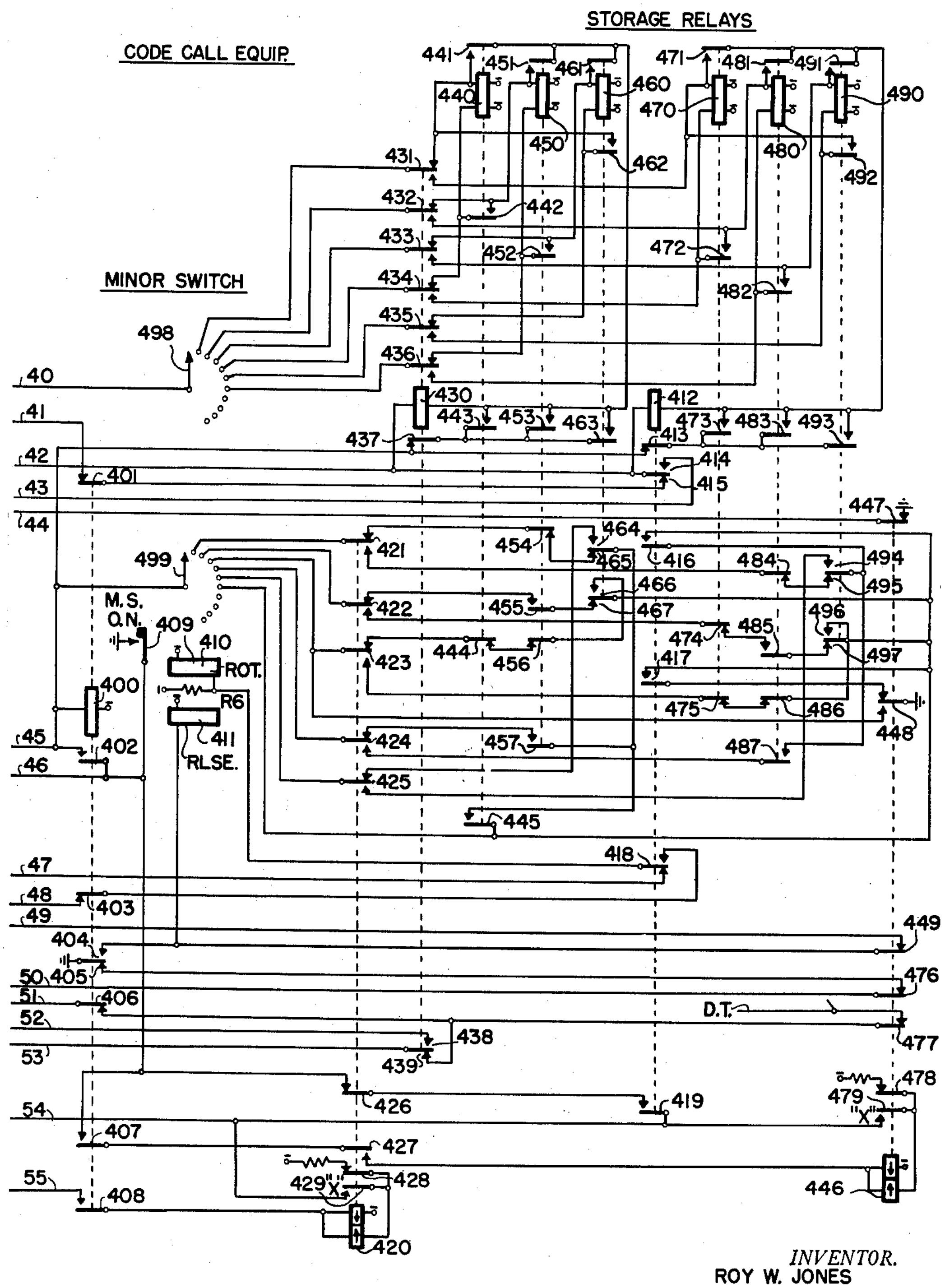
Figure 4 shows the remainder of the code-calling equipment which includes mainly the minor switch and the storage and control relays.

Referring now to Figures 3 and 4, it will be noted that only the subscribers having their extra control conductors (E. C.), such as 18, connected to the contact bank and accessible to the extra control wiper such as 394 of the code-call finder, can initiate a code-call. Only two code sounders such as 318 and 319 have been shown, however any determined number may be used depending upon the size of the structures within which the P. A. X is installed. The rotary switch in the code-call finder is similar in construction and operation to the rotary switch of the finder in the regular finder-connector links. The minor switch, or the code selecting switch may be of any convenient type or size using two banks and sets of wipers wherein the first six contacts of the first bank are connected to circuits to the storage relays and the first six contacts of the second bank are connected to circuits controlled by these storage relays. The six storage relays are divided into two groups, with relays 440, 450 and 460 being in the first group and relays 470, 480 and 490 being in the second group. Each code-call number is a two-digit number and may range from "11" through "66," thus providing a maximum of 36 code-call numbers. When dialling a code-call number, the first digit of the number operates one or more of the first group of storage relays and the second digit operates one or more of the second group of storage relays. For example; in the first group of storage relays, if the digits 1, 2 or 3 are to be stored, the relays 440, 450 or 460 are operated, while if the digits 4, 5 or 6 are to be stored, the relays 440 and 450, 440 and 460 or 450 and 460 are operated. In the second group of storage relays if the digits 1, 2 or 3 are to be stored, the relays 470, 480 or 490 are operated, while if the digits 4, 5 or 6 are to be stored, the relays 470 and 480, 470 and 490 or 480 and 490 are operated.

The following description covering the operation of the equipment in detail during local-to-local calls, executive right-of-way and code-call will now follow.

*Local-to-local calls*

The ensuing description will cover the operation of the illustrated equipment in Figures 1 and 2 during the initiation and completion of a local-to-local call.

Referring to the above-mentioned figures it will be noted that the negative and positive talking conductors of all the lines terminate in the finder bank contacts accessible to wipers 191 and 192 and in the connector bank contacts accessible to wipers 291 and 292. It will also be noted that the talking conductors of line L4 are connected to the 5th contacts in the banks of the finder-connector links and the talking conductors of line L13 are connected to the 15th terminals of the finder-connector links. It will be further noted that subscribers A and C are the first parties on their respective lines and subscribers B and D are the second parties on these lines.

Referring to the Table I included in the forepart of the specification, it will be seen that the call numbers of subscribers A and C are 5 and 05 respectively, while the call numbers of subscribers B and D are 14 and 195 respectively.

Assuming that subscriber A of line L4 desires to call subscriber C of line L13 the equipment will operate in the following manner:

As subscriber A removes his receiver, a loop circuit is closed across talking conductors 10 and 11 thereby completing an operative series circuit for relays 100 and 170, this circuit extending from ground at contacts 102, line conductor 11, the closed loop, line conductor 10, contacts 101, upper winding of relay 100 and down through the winding of relay 170 to battery.

In operating only "X" contacts 103 at this time, relay 100 applies a marking battery potential supplied from its lower winding over conductor 16 to the 5th contact of the bank terminating line L4's control conductor. Since line relay 100 is a combined line and cut-off two-step relay, its first step operation is now completed. In operating contacts 172, relay 170 completes a circuit to the line relay 120 of the illustrated finder-connector link, this circuit extending from ground at contacts 162, contacts 172, contacts 151 and through the upper winding of line relay 120 to battery. At contacts 171 a busy test circuit is prepared for testing for an all link busy condition through contacts controlled by the reset relay 160.

In operating contacts 121, relay 120 completes an obvious circuit to the hold relay 130 and at contacts 122 opens a point in the pulsing circuit.

It will be remembered that the calling line A has applied a battery potential to mark its corresponding contact in the control contact bank set over conductor 16, while all idle and busy lines apply ground potential to their respective contacts in the control contact bank set.

At contacts 131, relay 130 supplies a working ground potential for use by other relays in the seized finder-connector link, at contacts 133 a point in the pulsing circuit of line relay 120 is prepared and at contacts 134 a circuit is completed for the motor magnet 180; this circuit extending from ground at a contact terminating the control conductor of an idle or busy line, or (as shown) the grounded 26th contact, wiper 193, contacts 143, 145, 134, 181 and through the winding of motor magnet 180 to battery.

In operating, motor magnet 180 opens contacts 181, thereby breaking its own energizing circuit and thus the magnet restores. Assuming that the wipers 191 through 196 inclusive, are resting on their respective 26th contacts as shown, when magnet 180 restores, the wipers 191 through 196 are advanced one step, thereby engaging the first contact of their respective banks. As motor magnet 180 restored, it also closed contacts 181, thereby completing its previous energizing circuit. Upon re-operating, motor magnet 180 opens its contact 181 thereby opening its energizing circuit. In restoring, magnet 180 advances the wipers 191 through 196 a second step and again completes its energizing circuit at contacts 181. This selfinterrupted action between magnet 180 and its contacts 181 continues until the wipers 191 through 196 are rotated into engagement with the 5th contact which terminate the conductors of line L4 and the calling subscriber A.

As wiper 191 engages its 5th contact it encounters the battery potential supplied from the lower winding of the line and cut-off relay 100, thereby completing a circuit for the relay 140 through its upper winding and also preventing magnet 180 from reoperating. This circuit for operating relay 140 extends from ground at contacts 131, down through the upper winding of relay 140, up through the normal contacts of armature 143, wiper 193 and its engaged 5th contact, conductor 16, "X" contacts 103 and through the lower winding of relay 100 to battery.

In operating, relay 140 closes its "X" contacts 144 and locks itself operated by way of a circuit from ground at contacts 131, the lower winding of relay 140 and to battery through resistance R1. At contacts 141 and 142 relay 140 connects the talking conductors of line L4 to the line relay 120 of the seized link, and also completes a well-known dial tone circuit to the calling subscriber A over contacts 141. At armature 143 the break contact opened the previous energizing circuit of relay 140 and the make contact put ground potential out over the control wiper for operating the line and cut-off relay 100 in its second step operation, this circuit extending from ground at the make contacts of armature 143, wiper 193 and its engaged 5th contact, conductor 16, contacts 103 and through the lower winding of relay 100 to battery. At contacts 145 relay 140 opened the energizing circuit of motor magnet 180, at contacts 148 a circuit is completed for starting the tone equipment (not shown), at contacts 149 a circuit is prepared for relay 230 and at contacts 139 the circuit of relay 150 is opened, thereby busying the first link and its individual relays of the call allotter for additional use at the present time.

In completing its second step operation, relay 100 opens its original operating circuit at contacts 101 and 102, thereby allowing relay 170 to restore.

In restoring, relay 150 prepares the start circuit to the next idle link in rotation at contacts 152, at contacts 151 the previous energizing circuit to line relay 120 is opened, at contacts 153 the energizing circuit to relay 150 is opened, at contacts 154 relay 150 prepares a future circuit for itself and at contacts 155 prepares a point in the circuit to reset relay 160. Line relay 120, however remains energized from ground through its lower winding, the positive talking conductor of the calling line L4, the closed loop of subscriber A, the negative talking conductor of the line L4 and through the upper winding of line relay 120 to battery.

Dial tone is now transmitted out over the calling line in a well-known manner and upon receipt of said dial tone, subscriber A prepares to dial the first digit "0" of the call number "05." Line relay 120 will operate in the usual and well-known manner and deenergize and energize ten times in response to receipt of the dial pulses when the digit "0" is dialled. At the beginning of the first pulse, line relay 120 restores and opens the circuit to hold relay 130 at contacts 121. Relay 130 is constructed as being slow-to-release and therefore remains operated during dialling. At contacts 122, relay 120 completes circuits to the series relay 230 and the connector motor magnet 280; these circuits extending from ground at contacts 122, contacts 133, conductor 31, contacts 229, contacts 249 and (1) to the left over conductor 32, contacts 149, conductor 33 and through the winding of series relay 230 to battery; and (2) to the right and up through the winding of motor magnet 280 to battery. Relay 230 in operating contacts 231 opens a point in the busy tone circuit, at contacts 233 prepares a point in the busy test circuit, and at contacts 234 prepares a point in the future "homing" circuit for motor magnet 280. Motor magnet 280 energizes and deenergizes with each deenergization and energization of line relay 120. It will be noted that the magnet 280 advances its wipers 291 through 294 a single step each time upon restoration, therefore at the end of the first digit, wipers 291 through 294 will be engaged with their respective tenth contacts.

The slow-to-release series relay 230 remains operated during pulsing but restores between digits and therefore restores after the first digit has been dialled. The second digit "5" of the call number "05" is now dialled and the line relay 120 restores and reoperates a total of five times. Upon receipt of the first pulse of the second digit, relay 120 operates as described before, recompleting the circuit to the series relay 230 and the motor magnet 280 as previously traced. Series relay 230 operates as previously described and magnet 280 operates each time line relay 120 restores and restores each time line relay 120 operates, therefore after receipt of all pulses of the second digit "5," wipers 291 through 294 have been rotated an additional 5 steps and are now engaged with their respective 15th contacts. Motor magnet 280 will now have restored.

Before the series relay 230 has had time to restore after the last, or second, digit has been dialled, a busy test circuit is completed to the line L13 (which is connected to the 15th contact) having the called subscriber C thereon. If the called subscriber C is assumed to be busy, wiper 293 will encounter ground potential on its respective 15th contact, since this contact terminates the control conductor of the line L13 and will have ground potential on it whenever the line is busy. This ground would then complete an operative circuit to the busy relay 220 which could be traced from the contacts such as 247 of another link, other wipers such as 293, conductor such as 15, the 15th contact engaged by the wiper 293 of the illustrated finder-connector link, contacts 233 and through the relay 220 to battery.

It will be assumed, however that the called line is not busy, therefore wiper 293 will encounter a battery potential on the 15th contact terminating the control conductor of line L13. Relay 220 therefore will not operate and when the series relay 230 eventually restores a circuit is completed for the cut-through relay 240 at contacts 232. This circuit may be traced from ground at contacts 131, down through conductor 23, contacts 227, the lower winding of relay 240, contacts 232, wiper 293 and its engaged 15th contact, conductor 15, cable C60, conductor 15 and through the lower winding of line relay 110 to battery.

In operating "X" contacts 246, relay 240 locks from ground at contacts 131, conductor 22, contacts 226, contacts 246 and through the upper winding of relay 240 to battery. At contacts 241 relay 240 completes the ringing circuit to the called line over a circuit traced from battery at interrupted generator, through the upper winding of the ring cut-off relay 210, contacts 201, 211, 221, 241, over the negative talking conductor, wiper 291 and its engaged 15th contact, conductor 13, cable C60, conductor 13 of the called line L13 and through the ringer at substation C to ground. Also at contacts 241 and 245, relay 240 prepares for extending the talking connection through to the called line, at contacts 243 a point in the busy tone circuit is opened, also at contacts 245 a point is prepared in the circuit of relay 210 for subsequent operation as a cut-off relay, and at contacts 247 ground is applied to the C conductors of the called line L13 in all the finder-connector links for busying the called line L13 to future calls while the present one is in progress. At contacts 249 a point in the pulsing circuit to magnet 280 is opened.

The called line is now rung and after a reasonable period of time, the call is answered by the called party. The answering shunts the ringer at substation C and connects direct ground to the upper winding of ring cut-off relay 210, thereby causing relay 210 to operate as a cut-off relay. This circuit may be traced from ground at contacts 204, contacts 213, 225, 245, the positive talking conductor, wiper 292 and its engaged 15th contact, conductor 14, cable C60, conductor 14 of the line L13, through the closed loop at substation C, back over the previously traced ringing circuit and through the upper winding of relay 210 to battery at interrupted generator. In operating "X" contacts 215, relay 210 locks to ground at contacts 131. At contacts 211 and 213, relay 210 opens its previously traced ringing and operating circuits, and at contacts 212 and 214 completes the talking circuit connection from the calling subscriber to the called subscriber. At contacts 217 the starting circuit to the tone equipment is opened. The operation of contacts 212 and 214 also completed the circuit to the battery feed relay 200, this circuit being traced from ground through the lower winding of relay 200, normally closed contacts of armature 224, down through contacts 214, 225, 245 out over the positive talking conductor of the called line L13, back over the negative talking conductor of the called line, contacts 241, 221, 212, to the right over contacts 222 and through the upper winding of relay 200 to battery.

The conversation may now proceed in the usual manner with line relay 120 supplying talking battery to the calling subscriber and battery feed relay 200 supplying talking battery to the called subscriber.

After conversation is completed, both subscribers replace their receivers and the equipment will restore in the following manner:

As subscriber A replaces his receiver, line relay 120 restores, which at contacts 121 opens the circuit to the hold relay 130. As relay 130 restores the working ground supplied at contacts 131 is removed from the conductors 22 and 23 and relays 140, 210 and 240 restore. As relay 210 restores relay 200 is released, and as relay 240 restores the homing circuit for motor magnet 280 is completed, this circuit extending from ground at contacts 248, conductor 29, contacts 132, conductor 26, the second contact of the bank accessible by wiper 294, the multiple connected contacts, the contact engaged by wiper 294, contacts 281, 249 and through the winding of motor magnet 280 to battery. Motor magnet 280 operates and interrupts its own circuit at contacts 281, thereby deenergizing and stepping wipers 291 through 294, inclusive, one step. As motor magnet 280 restores it completes its circuit at contacts 281 and thereby energizes again, and opens the circuit to once more step the wipers. This interaction of magnet 280 with its contact 281 continues until wiper 294 has rotated off the 25th contact and onto the 26th, or home contact, whereby the circuit to motor magnet 280 is then opened and the wipers 291 through 294 are all on their respective home positions.

The equipment is now at normal and in condition to handle future calls. Before continuing with the next section of operation a short description of the combined operation of the battery feed and ring reversal relay 200 will be covered. The operation just described covered the operation of relay 200 functioning only as a battery feed relay. Relay 200 will operate additionally as a ring reversal relay, only when the second party of a line is called, hence the first digit of the call numbers of second parties is a prefix digit "1" which when dialed results in the operation of relay 200 as follows:

Assuming now that the calling subscriber A desires to call the second party such as subscriber D of the line L13. It will be remembered that the call number of subscriber D is "195." The seizing of the finder-connector link and its operation will be the same as just described, up to the point that the calling subscriber A dials the first digit "1" of the call number. When the digit "1" is dialed, line relay 120 will restore and reoperate once, causing motor magnet 280 to advance its wipers 291 through 294 one step, so that now the position of the wipers is such that they have been rotated off their normal positions and are in engagement with their respective first contacts. As wiper 293 engages its first contact an operative circuit is completed for relay 200, which may be traced from ground at contacts 131, down through conductor 23, contacts 227, the lower winding of relay 240, contacts 232, wiper 293 and its engaged first contact, back from contact number 1 and up through resistance R3, resistance R2 and through the winding of relay 200 to battery. Relay 240, however, does not operate in this circuit due to the resistances of R2, R3 and the resistance of the upper winding of relay 200.

In operating "X" contacts 205 relay 200 completes its own locking circuit from ground at contacts 131, conductor 22, contacts 216, contacts 205, resistance R2 and through the upper winding of relay 200 to battery. At contacts 201 relay 200 opens the normal ringing circuit (as shown) over the negative talking conductor, at contacts 202 prepares a point in the operation of ring cut-off relay 210, and at contacts 203 a point in the ringing circuit over the positive talking conductor is prepared.

The remaining digits of the called number may now be dialled and the system will operate as previously described. As the cut-through relay 240 is operated subsequent to the completion of dialling, the closing of contacts 241 and 245 complete the now reversed ringing circuit which may be traced as follows: battery from interrupted generator, the upper winding of ring cut-off relay 210, contacts 203, 213, 225, 245, the positive talking conductor, conductor 14 of the called line L13 and through the ringer of the called station D to ground. The system now continues to function and release (when required) as previously described.

*Executive right-of-way*

Subscriber C is shown as an executive's station and is equipped with a locking push-button 185, which provides the executive with executive's right-of-way, or cut-in, on busy lines. This special feature will function as described in the following paragraphs.

It will be assumed that subscriber A of line L4 is busy, and that subscriber C (the executive) of the line L13 has dialled the call number "5" of subscriber A and received a busy tone. All operations are the same as described in the previous section up to and including completion of the busy test circuit. At this time a ground potential supplied by the finder-connector link that is in use by the subscriber A is encountered by wiper 293 and a circuit is completed for busy relay 220 over a circuit traced from ground encountered by wiper 293, contacts 233 and through the winding of busy relay 220 to battery. It will be remembered that connections from the link in use by subscriber A are multipled to the 5th contacts of all other finder-connector links.

In operating contacts 221 and 225, relay 220 opens a point in the normal talking circuit from the called subscriber to the calling subscriber and a point in the circuit for the ring cut-off relay 210 is opened, at the break contacts of armatures 222 and 224 the battery feed relay 200 is removed from the talking conductors, at the make contacts of armatures 222 and 224 a point in the talking circuit for executive cut-in is prepared, and at the make contacts of armature 223 a busy tone circuit is completed for sending busy tone to the calling executive, thereby indicating to him that the called subscriber A is busy. At contacts 226, relay 220 opens a point in a locking circuit to relay 240, at the make contacts of armature 227 relay 220 prepare its future locking circuit from ground at contacts 131, at the make contacts of armature 228 a point in the executive cut-in circuit is completed, and at contacts 229 a point in the pulsing circuit of line relay 120 is opened. As previously stated, the busy test circuit was completed while the relay such as 230 was still operated and when a ground was encountered by wiper 293. When relay 230 releases, the contacts 234 will make before contacts 233 break, therefore enabling busy relay 220 to lock up as just described.

Upon receipt of the busy tone, the executive now depresses his push-button 185, thus completing a circuit for the combined cut-through and executive cut-in relay 240 over a circuit extending from ground at push-button 185, conductor 18, the 15th contact (line L13) engaged by wiper 194, contacts 146, conductor 24, the make contact of armature 228, conductor 30, wiper 195 and its engaged 15th contact, conductor 34 and through the winding of relay 240 to battery. The executive may lock his push-button 185, if desired, thereby maintaining relay 240 operated. In operating contacts 242 and 244, relay 240 completes the talking connection from the executive's station C to the busy subscriber A, and at contacts 247 busies line L13 in all finder-connector links to future calls while in use by the executive. Busy tone is also removed at contacts 243 due to the operation of relay 240. The executive is now directly connected with the subscriber A for either monitoring purposes, or conversation, as desired.

As previously mentioned, the executive may now monitor or converse with subscriber A, however, under present conditions two finder-connector links are in use at the same time, which is normally undesirable in a small exchange of this type, therefore the executive may request subscriber A to end his present conversation and hang up and thus release the finder-connector link in use by subscriber A. The executive then releases his seized link by replacing his receiver. At this time the executive can re-establish connections with subscriber A, if desired, by using the same procedure as described in the previous section entitled "Local-to-local calls."

Upon completion of the conversation between the executive and subscriber A, the equipment is released in the same manner as described in the previous section.

*Code-call*

The following description will cover the operation of the illustrated equipment shown in Figs. 1 through 4 wherein a code-call is initiated, completed and answered. Referring to the above-mentioned figures, it will be noted that only those stations whose extra control (EC) conductors are connected to the line finder such as shown in Figure 1 of the finder-connector links and the code-call finder such as shown in Figure 3 of the code-call equipment can establish a code-call. However, a code call may be answered from any subscribers station. It will also be noted that for the following description the EC conductor 18 of the executive (subscriber C) is connected as described above.

In referring to Table I, it will be noted that the code-call answering number is the three digit number "005."

It will be remembered that each subscriber whom it is desired to code-ring, or page, is given an individual two-digit code-call number. These numbers may range from "11" through "66" inclusive, using no digits greater than 6, therefore it is evident that a maximum of 36 code-calls may be rung by the illustrated equipment.

Assuming now that subscriber C wishes to talk to subscriber B and that subscriber B has been given the individual code number such as "31." It is also assumed that subscriber C has called subscriber B in the usual manner such as described in the section entitled "Local-to-local calls" and has been informed that subscriber B is somewhere at large within the place that the present exchange is installed. Upon receiving the above information about subscriber B, subscriber C then releases the finder-connector link taken into use for the former call, by replacing his receiver to sever the connection.

To initiate a code-call for subscriber B, subscriber C proceeds in the same manner as when initiating a local-to-local call. Upon receipt of dial tone from his seized finder-connector link, subscriber C depresses his push-button 185 which completes a circuit for operating the start relay 300 of the code-call finder in Figure 3. This circuit for relay 300 may be traced from ground at push-button 185, conductor 18, contact 15 engaged by wiper 194, contacts 146, conductor 24, break contacts of armature 228, code-call start conductor 39, break contacts of armature 336, contacts 351 and through the lower winding of relay 300 to battery.

In operating contacts 301 relay 300 completes a circuit to line relay 305 which may be traced from ground through the lower winding of relay 305, contacts 354, 301 and through resistance R4 to battery. In operating contacts 306 line relay 305 completes an obvious circuit to the hold relay 310. In operating contacts 311, hold relay 310 completes an obvious locking circuit for relay 300, at contacts 312 a point in the operating circuit to one of the first digit storage relays is prepared, at contacts 313 a point in the circuit to relay 330 and rotary magnet 410 is prepared, at contacts 314 a circuit is completed to motor magnet 380 and at contacts 315 a point in the operating circuit of relay 350 in series with relay 360 is prepared. The circuit for motor magnet 380 may be traced from ground at contacts 314 down and to the left through contacts 358, 361 and the winding of motor magnet 380 to battery. In operating contacts 381, motor magnet 380 completes an obvious circuit for the relay 360. In operating, relay 360 opens contacts 361, thereby opening the circuit to motor magnet 380. In restoring motor magnet 380 advances its wipers 391 through 395 one step and opens the circuit to relay 360 at contacts 381. As relay 360 restores the circuit to motor magnet 380 is again completed at contacts 361. This interaction between relay 360 and motor magnet 380, including their respective contacts 361 and 381, continues until wipers 391 through 395 have been advanced into engagement with their respective 15th contacts. These contacts are connected to the conductors of the calling line L13. At the time that said wipers engage their 15th contacts a circuit is completed for the switching relay 350. This circuit for relay 350 may be traced from ground at push-button 185, conductor 18, cable C70, conductor 18, the 15th contact engaged by wiper 394 through the upper winding of relays 350 and 360, contacts 315 and through resistance R5 to battery. In this circuit only relay 350 will operate, which at "X" contacts 357 completes its own locking circuit from ground at contacts 314. At contacts 351 relay 350 opens the locking and energizing circuit of relay 300, at contacts 352 and 353 the line relay 305 is connected to the talking conductors of the calling line L13. At contacts 354 the previous energizing circuit of line relay 305 is opened, however line relay 305 now remains operated over the closed loop of subscriber C on line L13. At contacts 355 a ground is applied to the control conductor 15 of the calling line L13 in all connector links for busying the line to incoming calls and also for busying the code-call equipment. At contacts 356 relay 350 shunts its upper winding and that of relay 360. However, relay 350 remains operated over its lower winding. At contacts 358 a point in the operating circuit of motor magnet 380 is opened and at contacts 359 a ground potential is applied to the conductor 19 in the seized finder-connector link for shunting down the relay 140. Since ground potential is applied to the right side of the lower winding of relay 140 over an obvious path from ground at contacts 131, the ground applied to the left side of the lower winding of relay 140 may be traced as follows: ground at contacts 359, wiper 395 and engaged 15th contact, conductor 19, cable C70, conductor 19, the 15th contact engaged by wiper 196 and to the left side of the lower winding of relay 410.

In restoring, relay 140 releases the line relay 120 of the seized finder-connector link which in turn releases the hold relay 130, thereby releasing the seized finder-connector link to normal.

At the time that relay 350 connected line relay 305 to the talking conductors connected to the line L13, dial tone is transmitted from the code-call equipment back to subscriber C of the calling line. This dial tone circuit may be traced from the incoming dial tone conductor of Figure 4, contacts 447, 439, conductor 53 and to the negative talking conductor of the calling line to subscriber C. Upon receipt of dial tone, subscriber C dials the first digit "3" of the code-call number "31" which has been assigned to subscriber B. Line relay 305 responds to these dial pulses in a well known manner, releasing and reoperating three times each. Upon receipt of the first pulse of the dialed digit "3," line relay 305 releases and at contacts 307 completes a circuit to the series relay 330 and the rotary magnet 410 of the minor switch. This circuit may be traced from ground at contacts 337, contacts 307, 313; (1) down through conductor 47, the break contacts of armature 418 and through the winding of magnet 410 to battery; and (2) through the winding of relay 330 to battery. The series relay 330 is constructed as being slow-to-release and will remain operated during pulsing but will release between digits, while the hold relay 310 will remain operated all during dialing. At the end of the first pulse, line relay 305 is again operated and the circuits to relay 330 and rotary magnet 410 are opened, however relay 330 remains energized as stated but magnet 410 restores, thereby advancing wipers 498 and 499 one step. The remaining two pulses of the digit "3" operate line relay 305 as described for the first pulse. Therefore, it will be noted that at the end of the pulsing of the first digit, relay 330 will release and the wipers 498 and 499 controlled by magnet 410 will be engaged with their respective 3rd contacts.

As relay 330 restores contacts 331 and as wipers 498 and 499 engage their respective third contacts, a circuit is completed for the first digit storage relay 460, this circuit extending from ground at contacts 326, 312, conductor 42, contacts 415, 401, conductor 41, contacts 331, conductor 40, wiper 498 and engaged third contact, the break contact of armature 433 and through the upper winding of relay 460 to battery. In operating contacts 461 and 463 relay 460 completes a circuit for the relay 400 and also prepares a circuit at contacts 461 for relay 430. Relay 430 at the present is prevented from operating by having ground potential applied to both sides of its winding. The circuit for relay 400 may be traced from ground at contacts 326, 312, conductor 42, contacts 415, 401, conductor 41, contacts 331, conductor 40, wiper 498 and engaged third contact, the break contacts of armature 433, contacts 461, 463, 437 and down through the winding of relay 400 to battery. In operating contacts 401, relay 400 completes a circuit for the relay 430 which now operates in series with the relay 460, this circuit extending from ground at contacts 326, 312, conductor 42, the winding of relay 430, contacts 461 and through the upper winding of relay 460 to battery. It will be remembered that as the wipers of the minor switch were moved off their normal position, the off-normal springs 409 closed, therefore at contacts 402 relay 400 completes an obvious locking circuit for itself. At contacts 404 relay 400 completes an obvious circuit to the release magnet 411. In operating, release magnet 411 allows the spring action applied to wipers 498 and 499 to return them to normal, at which time, off-normal springs 409 are opened, thus opening the locking circuit of relay 400. In restoring, relay 400 prepares a point in the operating circuit to one of the second digit storage relays at contacts 401, and at contacts 404 opens the circuit to release magnet 411. In operating armatures 431 through 436, inclusive, relay 430 switches the circuits to the second digit storage relays in preparation to receiving pulses representing the second digit of the code-call number, at contacts 437 a point in the previous energizing circuit of relay 400 is opened and at contacts 439 dial tone is removed from the calling line.

The second digit "1" of the code-call number "31" is now dialled, with line relay 305 responding to the received dial pulses in a well-known manner. Responsive to receipt of the first pulse, line relay 305 restores and completes previously traced circuits for the series relay 330 and the rotary magnet 410 at contacts 307. Rotary magnet 410, in operating, prepares to advance its wipers 498 and 499 one step. Line relay 305 now reoperates at the end of the pulse, and opens the circuits to series relay 330 and rotary magnet 410, thereby causing them to restore. The restoring of rotary magnet 410 advances its wipers 498 and 499 one step. The operation of relay 330 removes the ground potential applied to wiper 498 (while stepping) at contacts 331. Since this single operation of line relay 305 represents the total number of pulses received during the dialling of the digit "1," a circuit is completed for the second digit storage relay 470 when the release of relay 330 has again closed contacts 331. This circuit for storage relay 470 may be traced from ground at contacts 326, 312, conductor 42, contacts 415, 401, conductor 41, contacts 331, conductor 40, wiper 498 and its engaged first contact, the break contacts of armature 431 and through the upper winding of relay 470 to battery. In operating contacts 471 and 473, relay 470 completes a circuit for the relay 400 which includes the previously traced operating circuit of relay 470 with ground being applied to contacts 471, contacts 473, 413 and down through the winding of relay 400 to battery.

In operating contacts 401, relay 400 completes a circuit for the relay 412 to operate in series with the relay 470 over a path similar to the circuit previously traced for the relays 430 and 460. At contacts 402 relay 400 locks itself operated to the ground applied to the off-normal springs 409 which are again closed, and at contacts 404 a circuit is again completed to the release magnet 411. In operating, release magnet 411 restores wipers 498 and 499 to normal as previously described.

At contacts 413, which are constructed to operate primarily before the others, relay 412 opens the energizing circuit to relay 400, also since wipers 498 and 499 of the minor switch are at their normal position, the off-normal springs 409 are opened, thereby the locking circuit of relay 400 is opened and it will restore. At contacts 414 a circuit is completed by relay 412 for relay 340, this circuit extending from ground at contacts 326, 312, conductor 42, contacts 414, conductor 43, contacts 346 and through the winding of relay 340 to battery. Since relay 340 is constructed as being slow-to-operate, this relay will not operate at the present. At contacts 415 relay 412 opens a point in the energizing circuits for the first and second digit storage relays, and at contacts 416 and 417 a marking ground potential supplied by way of contacts 448 is applied to certain contacts (differing with respect to the stored digits of the code-call number) of the contact bank accessible by wiper 499. Since the stored digits in this case are "3" and "1," this ground potential is applied to the third and sixth bank contacts over the following circuits: from ground at contacts 448, contacts 417, 466, 456, 444, the break contact of armature 423 and to the third bank contact; ground at contacts 448, contacts 417, back, down and to the left to the sixth bank contact. However, as explained later more in detail, only the marking on the third bank contact will be used at this time. At the make contacts of armature 418, a circuit is prepared for the rotary magnet 410 and at contacts 419, a point in the locking circuits of relays 420 and 446 is prepared.

After a normal period of time, relay 340 operates and at contacts 341 completes a circuit for relay 345, which will not operate at the present since it is constructed as being slow-to-operate. At contacts 343 relay 340 completes a circuit for the code-sounder control relay 365, this circuit extending from ground at contacts 405, 476, conductor 50, contacts 343 and through the winding of relay 365 to battery. At contacts 344 relay 340 applies a "splash" of dial tone to the negative conductor of the calling line L13.

In operating contacts 366, relay 365 completes an obvious circuit to the code-sounders 318 and 319, which upon being energized operate their gongs a single time.

At this time relay 345 will operate. At contacts 346 the circuit to relay 340 is opened and at contacts 347 a point in the operating circuit for rotary magnet 410 is prepared. Relay 340 now releases and at contacts 341 opens the circuit to relay 345, at contacts 342 completes the operating circuit for rotary magnet 410 which may be traced from ground at contacts 342, 347, conductor 48, contacts 403, the make contacts of armature 418 and through the winding of rotary magnet 410 to battery. Magnet 410, thereby, advances its wipers 498 and 499 one step. At contacts 343 relay 340 opens the circuit to the code-sounder control relay 365, and at contacts 344 removes dial tone from the negative conductor of the calling line. In restoring, at contacts 346, relay 345 again completes the operating circuit for relay 340, and at contacts 347 opens the previously traced energizing circuit of rotary magnet 410. The code-sounder control relay 365 restores and releases the code-sounders 318 and 319. In reoperating, relay 340 again completes the previously mentioned operating circuit for relay 345; completes the previously mentioned circuit for code-sounder control relay 365 and puts a second "splash" of dial tone out over the negative line conductor. The code-sounder control relay 365 reoperates the code-sounders 318 and 319 to sound a second single stroke. Relay 345 reoperates at this time; opens the circuit to relay 340 and prepares a point in the previously traced circuit to rotary magnet 410. At this time relay 340 again restores to complete the previously mentioned operating circuit for rotary magnet 410; opens the circuit to relay 345; opens the circuit to code-sounder control relay 365 and removes dial tone from the negative line conductor. Magnet 410, reoperates and advance its wipers 498 and 499 a second step. The code-sounder control relay 365 restores and releases the code-sounders 318 and 319.

In restoring, relay 345 completes the circuit for reoperating relay 340 and opens the previous energizing circuit of magnet 410.

In reoperating again, relay 340 completes the circuit for relay 345; completes the circuit for code-sounder control relay 365 and puts a third "splash" of dial tone out over the negative line conductor. The code-sounder control relay 365 reoperates the code-sounders 318 and 319 to sound a third single stroke. Relay 345 reoperates; opens the circuit to relay 340 and prepares a point in the circuit to rotary magnet 410. At this time relay 340 restores and completes the operating circuit for rotary magnet 410; opens the circuit to relay 345; opens the circuit to code-sounder control relay 365 and removes dial tone from the negative line conductor. The code-sounder control relay 365 restores and releases the code-sounders 318 and 319.

Magnet 410 reoperates and advances wipers 498 and 499 a third step. Since it has been previously mentioned that relay 345 is slow-to-operate, the relay will inherently also be slightly slow-to-release. Therefore, as wiper 499 engages its third contact, and before relay 345 has released, an obvious circuit is completed from the previously mentioned ground-connected third contact for operating relay 400. In operating, relay 400 locks up to the off-normal springs 409 (which are closed for the present) by way of contacts 402, opens the energizing circuit of rotary magnet 410 at contacts 403, completes a previously traced operating circuit for the release magnet 411 at contacts 404, opens a point in the operating circuit to code-sounder control relay 365 by way of contacts 405, opens the dial tone circuit at contacts 406 and prepares a point in the energizing circuit of relay 420 at contacts 408.

At this time relay 345 is completely restored and at contacts 346 a previously traced circuit is completed for relay 340. Release magnet 411 has now operated to restore wipers 498 and 499 to normal, thereby opening the aforementioned energizing and locking circuits of relay 400. Relay 400, however, is held operated over a circuit extending from ground at contacts 314, 386, conductor 54, contacts 419, 426, 402, and through the winding of relay 400 to battery.

After a reasonable period of time relay 340 operates, completing a previously mentioned operating circuit for relay 345 and an energizing circuit for relay 420. This latter circuit may be traced from ground at contacts 341, down through conductor 55, contacts 408; (1) through the upper winding of relay 420 to battery; and (2) through the lower winding of relay 420, contacts 428 and through the resistance to battery. Relay 420 does not operate at this time since the upper and lower winding of the relay are in opposition in this circuit.

After a definite period of time, relay 345 operates and opens the circuit to relay 340, which upon restoring opens the operating circuit of relay 345 and also opens the energizing circuit of relay 420 at contacts 341. However, the opening of the energizing circuit to relay 420 causes an inductive surge of current in the windings of the relay, resulting in the closing of "X" contacts 429 (first step operation). The closing of the "X" contacts 429 now completes a series aiding circuit through both windings of relay 420 thereby causing it to operate fully (second step). This circuit may be traced as follows: from ground at contacts 314, 386, conductor 54, contacts 429 through the lower winding of relay 420 and through the upper winding of relay 420 to battery. The two windings of relay 420 now aid each other in its operation through the second step. At armatures 421 through 425 relay 420 changes the circuits from which the marking ground at 448 is applied to the contacts of the contact bank accessible by wiper 499, at contacts 426 the last traced holding circuit of relay 400 is opened, at contacts 427 a point in the energizing circuit of relay 446 is prepared and at contacts 428 the battery potential and resistance is removed from the previous energizing circuit of relay 420. At this time relay 345 restores and completes the previously mentioned operating circuit for relay 340. Relay 400 also restores and prepares the equipment for sending out the second code corresponding to the second digit of the code-call. The operation of armatures 421 through 425 applies a marking ground potential to the following contact of the bank accessible by wiper 499: ground from armature 448, contacts 417, up through contacts 416, 495, 484, the make contact of armature 421 and to the first contact of the contact bank. The sixth contact of the contact bank is marked by this ground potential over the same circuit as previously traced, but as mentioned before is not used at this time.

At this time relay 340 operates and at contacts 341 completes the previously described operating circuit to relay 345, at contacts 343 completes the previously described circuit to code-sounder control relay 365 and at contacts 344 puts a "splash" of dial tone out over the negative conductor of the calling line. Code-sounder control relay 365 operates its contacts 366, which completes a circuit to the code-sounders 318 and 319. Code-sounders 318 and 319 now operate to sound a single stroke. Relay 345 now reoperates, opening the circuit to relay 340 and preparing a point in the circuit to rotary magnet 410.

At this time, relay 340 restores, thereby completing a previously traced circuit for rotary magnet 410, opens the circuit of relay 345, opens the circuit to code-sounder control relay 365 and removes the "splash" of dial tone from the negative line conductor of the calling line. Magnet 410 operates and advances its wipers 498 and 499 one step into engagement with their respective first contacts. At the moment that wiper 499 engaged its respective first contact, the applied ground potential previously traced thereto completes an obvious circuit for the relay 400, which upon operating locks up to the minor switch off-normal springs 409. At this time relay 345 restores and opens the previously described operating circuit of rotary magnet 410 and closes the circuit to relay 340, which does not operate at the present due to its slow-to-operate characteristics.

In operating, relay 400 opens a further point in the circuit to rotary magnet 410, completes a circuit to the release magnet 411, opens a point in the operating circuit to code-sounder control relay 365, opens a point in the dial tone circuit, and completes an energizing circuit for both windings of the relay 446. This energizing circuit for relay 446 being traced from ground at the off-normal springs 409, down through contacts 407, 427; (1) through the upper winding of relay 446 to battery, and (2) through the lower winding of relay 446, contacts 478 and the resistor to battery. Relay 446 does not operate at this time since the upper and lower windings of the relay are in opposition in this circuit. The release magnet 411 now operates to restore the minor switch wipers 498 and 499 to normal, at which time, relay 400 restores since its locking circuit is opened at off-normal springs 409. At the time that the locking circuit of relay 400 was opened, the energizing circuit of relay 446 was also opened. The opening of this energizing circuit at contacts 407 caused an inductive surge of current in the windings of relay 446, resulting in the closing of "X" contacts 479 (first step operation). The closing of the "X" contacts 479 now completes a series-aiding circuit through both windings of relay 446, thereby causing it to operate fully (second step). This circuit may be traced as follows: from ground at contacts 314, 386, conductor 54, contacts 479 through the lower winding of relay 446 and through the upper winding of relay 446 to battery. The two windings of relay 446 now aid in its operation through the second step.

In operating, relay 446 removes a working ground normally applied to the code-call equipment at contacts 447, at the make contacts of armature 448 applies an obvious marking ground to the third contact of the bank accessible by wiper 499, at contacts 449 prepares a point in the circuit for relay 385, at contacts 476 opens a point in the circuit to the code-sounder control relay 365, at contacts 477 opens a point in the dial tone circuit and at contacts 478 removes the battery and resistance from its previous energizing circuit.

At this time relay 340 operates and completes a circuit for the relay 345. After a predetermined interval of time, relay 345 operates to prepare a point in the circuit to rotary magnet 410 and opens the circuit to relay 340. Upon restoring, relay 340 completes the circuit to rotary magnet 410 and opens the circuit to relay 345. It will be noted that now during the present operations of relays 340 and 345 the "splashes" of dial tone are not transmitted to the calling line and the code-sounder control relay 365 is not operated. Rotary magnet 410 operates at this time and advances its wipers 498 and 499 one step. Relay 345 now restores to open the circuit of rotary magnet 410 and again complete the circuit to relay 340. Upon reoperating, relay 340 completes the circuit to relay 345, which after an interval of time operates to open the circuit to relay 340 and prepare the circuit for rotary magnet 410. When relay 340 restores, the circuit is opened to relay 345 and a circuit is completed for rotary magnet 410, which in turn operates to advance its wipers a second step. When relay 345 restores, the circuit is again completed for relay 340, which operates and completes the circuit to relay 345 again. When relay 345 reoperates, the circuit to relay 340 is opened. Upon restoring, relay 340 completes the circuit to rotary magnet 410 and opens the circuit to relay 345. Rotary magnet 410 now operates to advance its wipers a third step. At this time the wiper 499 engages the grounded third contact and a circuit is completed for the relay 400, which operates and locks to ground at the off-normal springs 409. At this time relay 345 restores to complete a circuit to the relay 340. Relay 400 completes the previously traced circuit for the release magnet 411 and also, at the same contacts 404, completes a circuit for the relay 385. This circuit may be traced from ground at contacts 404, 449, conductor 49 and through the winding of relay 385 to battery. The operation of release magnet 411 restores the switch to normal as previously described. Upon operating contacts 386, relay 385 opens the locking circuits of relays 420 and 446. In restoring armatures 421 through 425 relay 420 conditions the marking circuits to the contact bank, accessible by wiper 499, for the subsequent transmission of the first half of a new code cycle and at contacts 426, 427, 428 and 429 prepares future points in the energizing and operating circuits of itself and relay 446. In restoring armature 448 to normal, relay 446 applies the previously traced ground potential to the third and sixth contacts of the contact bank accessible by wiper 499. At contacts 449 relay 446 opens the circuit to relay 385, at contacts 476 a point in the operating circuit to relay 365 is prepared, at contacts 477 a point in the dial tone circuit is prepared and at contacts 478 and 479 points in the future energizing and operating circuits of itself are prepared.

The first code ringing cycles has been completed at this time. Relay 340 will now operate to initiate the beginning of a second code ringing cycle, operating the equipment in the same manner as described for the first cycle. The code ringing will continue until the paged party (subscriber B) answers the call or the calling party (subscriber C) replaces his receiver to thereby release the connection.

After hearing his code being rung, subscriber B answers the call by dialling the common three digit code-call answering number "005." In answering, subscriber B removes the receiver of the telephone at the nearest station and seizes a finder-connector line such as shown in Figures 1 and 2 in the same manner as described in the section entitled "Local-to-local calls." The code-call answering number is then dialled and the equipment operates in the same manner as described in the above-mentioned section, with the wipers of the connector stopping first on their tenth contacts in response to the first digit, stopping on their twentieth contacts after the second digit and finally stopping on their respective twenty-fifth contacts after the third digit. Upon completion of dialling the last digit, wipers 291 through 294 inclusive are engaged with their respective twenty-fifth contacts. As wiper 293 engages its twenty-fifth contact, a circuit is completed for the cut-through relay 240, this circuit extending from ground at contacts 131, down through conductor 23, the break contact of armature 227, the lower winding of relay 240, contacts 232, wiper 293 and its engaged twenty-fifth contact, conductor 58, cable C80, conductor 58, and through resistance R4 to battery.

In operating contacts 241 and 245, relay 240 completes a series circuit for the ring cut-off relay 210 and the answering relay 320. This circuit being traced as follows: ground at contacts 204, contacts 213, 225, 245, wiper 292 and its engaged twenty-fifth contact, conductor 57, cable C80, conductor 57, contacts 325, through the upper winding of relay 320, contacts 322, conductor 56, cable C80, conductor 56, the twenty-fifth contact engaged by wiper 291, contacts 241, 221, 211, 201, the upper winding of relay 210 and to battery at interrupted generator. Relay 210 operates as described in the previously mentioned section entitled "Local-to-local calls." In operating, relay 320 closes "X" contacts 323 to complete an obvious locking circuit over its lower winding from ground at contacts 314. The operation of contacts 321 and 324 complete the talking connection between the answering subscriber B and the calling subscriber C, contacts 322 and 325 are opened, thereby opening the previous energizing circuit to relay 320, at contacts 326 the working ground potential for the storage relays and control relays of the code-call equipment is removed and at contacts 327 an alternate holding potential for the line relay 305 is maintained to provide for last-party-release of the code-call equipment.

The code ringing will continue until the code sending cycle has been completed, at which time the full operation of relay 446 at contacts 447 will remove the other working ground potential so that relay 340 can not reoperate. Since relay 340 does not reoperate, relay 345 also will not operate, thereby preventing the equipment from sending any further codes at this time. The previously mentioned talking connection between subscriber B and subscriber C includes the code-call finder connected directly to subscriber C, the code-call talking conductors, and the finder-connector link, such as shown in Figs. 1 and 2 taken into use by subscriber B when answering the code-call. The talking connections include the heavy outlined talking conductors, with talking battery for subscriber C being supplied through the line relay 305, and talking battery for subscriber B being fed through the line relay such as 120 of the seized finder-connector link.

At the end of conversation and in response to replacing of the receivers, the equipment is released in the following manner: The finder-connector link taken into use by subscriber B is released in the same manner as described in the previous section entitled "Local-to-local calls" and the release of the code-call equipment is initiated and completed by the last party who replaces his receiver.

Assuming for the present that the answering subscriber B replaces his receiver first, his associated finder-connector link will be released as just mentioned. Relay 320 will remain operated over its previously described holding circuit and nothing will occur in the code-call equipment until subscriber C replaces his receiver. When subscriber C replaces his receiver the loop circuit is open to the line relay 305, which then restores and in so doing opens the circuit to the hold relay 310. The hold relay 310 then opens the holding circuits of the switching relay 356 and the answering relay 320 and these relays restore. The switching relay 356 removes the busy condition from the code-call finder and the code-call equipment is at normal and conditioned to handle future calls.

Assuming now that the subscriber C replaces his receiver first. The circuit for the line relay 305 is opened and this relay restores. The restoring of line relay 305 has no effect on the code-call equipment at the present since the hold relay 310 is maintained operated over a circuit extending from ground at contacts such as 131 (in the finder-connector link associated with subscriber B), conductor 23, break contacts of armature 227, the lower winding of relay 240, contacts 232, wiper 293 and its engaged twenty-fifth contact, conductor 58, cable C80, conductor 58, contacts 327 and through the winding of hold relay 310 to battery. The ground supplied at contacts 314 of relay 310 maintains holding circuits for the switching relay 356 and the answering relay 320. At the time that the calling subscriber B replaces his receiver, the finder-connector link such as shown in Figs. 1 and 2 restore as previously described, and at the time that ground is removed from contacts 131 the holding circuit of the relay 310 is opened and this relay restores. At this time, relay 310 opens the previously mentioned holding circuits of the switching relay 356 and the answering relay 320 and they restore. The code-call equipment is again at normal and conditioned to handle future calls.

Before continuing with the present description, it will be noted that while only one code-call machine (Figs. 3 and 4) has been described as serving this system, two or more of these machines could be used by dividing the system and connecting the CR conductors of certain of the finder-connector links to certain of the code-call finders.

Special alarm

The code-call equipment is sometimes used for sending special alarms, or starting and dismissal signals. Usually these special alarms, or signals, are of greater importance than regular code-calls and hence, should have right-of-way over these code-calls. The special alarm, or signal, is a non-coded uninterrupted signal which may be initiated by any equipment that will apply a ground potential to the special code alarm conductor. The grounding means as illustrated in Figure 3 is a locking key such as 328.

Assuming for the present that the code-call equipment is idle, a special alarm may be initiated and sent in the following manner: key 328 is closed and locked, thus completing an obvious circuit for the alarm relay 335. Relay 335 in operating the break contacts of armature 336 opens a point in the operating circuit of start relay 300 so that the code-call equipment can not be seized, at contacts 338 an obvious circuit is completed for relay 340 and at contacts 339 a point in the locking circuit of relay 400 is prepared.

After a normal period of time, relay 340 operates and at contacts 341 completes a previously traced circuit for the relay 345. At contacts 343, relay 340 completes a previously traced circuit for code sounder control relay 365. In operating, relay 365 completes an obvious circuit to the code sounders 318 and 319, which operate to ring a single time. After a reasonable period of time, relay 345 operates to open the circuit to relay 340 and prepare a point in the circuit to the rotary magnet 410. Relay 340 restores to open the circuits of relays 345 and 365 and completes a previously traced circuit to rotary magnet 410. Relay 365 restores and opens the circuit to the code sounders 318 and 319. Rotary magnet 410 operates to advance its wipers a single step, at which time a circuit for the relay 400 is completed from the off-normal springs 409. At this time, the operation of relay 400 momentarily opens the circuit to rotary magnet 410 and closes the circuit to the release magnet 411. Relay 345 restores and completes the circuit to relay 340. Release magnet 411 restores the wipers to normal and in so doing, the off-normal springs 409 are opened. The opening of off-normal springs 409 open the circuit of relay 400. Relay 400 restores to prepare circuits for rotary magnet 410 and code sounder control relay 365 and also opens the circuit of release magnet 411. At this time, relay 340 operates to again complete the circuits of relay 345 and code sounder control relay 365. In operating, relay 365 completes the circuit for operating code sounders 318 and 319 to ring another single time. Relay 345 now operates to open the circuit of relay 340. It will be noted that this interaction between relays 340 and 345 (and the equipment controlled by them) will continue until key 328 is released, at which time the circuit to relay 340 is opened, thereby preventing relay 340 from operation and the subsequent operation of relays 345 and 365.

Assuming now that the code-call equipment is in operation at the time that key 328 is closed and locked, and that relay 335 is operated during the middle of a code sending cycle, the following operations will take place. The operation of contacts 338 by relay 335 prepares a point in the circuit to relay 340 and at contacts 339 a circuit is completed for operating relay 400, this circuit may be traced from ground at off-normal springs 409, conductor 46, contacts 339, conductor 45, and through the winding of relay 400 to battery. In operating relay 400 momentarily opens the circuit to rotary magnet 410 and closes the circuit to release magnet 411. The circuit to code sounder control relay 365 is also opened. Release magnet 411 operates to restore wipers 498 and 499 to normal, at which time off-normal springs 409 open the circuit to relay 400.

Relay 400 restores, prepares a point in the circuit to rotary magnet 410, opens the circuit to release magnet 411 and prepares a point in the circuit to code sounder control relay 365. Assuming that relay 345 has restored subsequent to the operation of relay 335, said restoration has completed a circuit to relay 340. Relay 340 operates at this time and completes a circuit for code sounder control relay 365 and also completes a circuit for relay 345. The code sounder control relay 365 operates code sounders 318 and 319 to ring a single time. Relay 345 operates and opens the circuit to relay 340 and prepares the circuit to rotary magnet 410. After a normal period of time relay 340 releases and completes a previously described circuit to rotary magnet 410 and opens the circuit to code sounder control relay 365. The operation of the equipment will now continue in the same manner as previously described under the condition when assuming that the code call equipment was idle, with the alarm being sent out in the same manner. Upon completion of the alarm being sent out, the key 328 is released and relay 335 restores. The operating circuit for relay 400 is opened by relay 335 and after the minor switch wipers have been returned to normal and release magnet 411 and relay 400 have restored, relay 340 operates as previously described and the equipment prepares to code ring the desired party by starting at the beginning of a ringing cycle, wherein relay 340 operates code sounder control relay 365 to cause the code sounders to send out the first ring of the code. The remainder of the operation of the equipment and its release is the same as described in the previous section entitled "Code-call."

Having described my invention, what is considered new and is desired to have protected by Letters Patent will be pointed out in the following claims.

What is claimed is:

1. In a code-call system, calling lines, code-calling equipment, regular finder switches having access to said lines, code-call finder switches also having access to said lines, a calling device and a manually operable circuit-closer other than said calling device for each line, means operated responsive to the initiation of a call over any line by removal of the receiver thereon for always causing one of the regular finder switches to seize and connect with the calling line, means operated thereafter over the said regular finder responsive to the operation of said calling device by said calling line for extending only a local connection from the line in case said circuit closer is not operated, and means operated responsive only to the operation of the circuit-closer on said calling line when operated before any operation of the calling device thereat, for starting, by way of said connected regular finder switch, the operation of, one of said code-call finder switches to seize the calling line and extend a connection from the calling line direct to said code-calling equipment, said last mentioned connection thereby causing the release of said regular finder switch which has seized and connected with the calling line, said code calling equipment thereafter being operable by said calling device of said calling line to complete a code call.

2. In a telephone system, subscriber lines having stations thereon, means including a calling device individual to each of said stations, switching means comprising finder-connector links common to said lines for extending only local connections between calling and called ones of said stations on said lines, means controlled responsive to the initiation of a call by a calling one of said stations for causing the finder of one of said finder-connector links to seize and connect with said calling line, code-calling apparatus including an automatic hunting switch, a circuit including only said connected finder portion of said one finder-connector link, and extending into said code-calling apparatus, manually operable means other than said calling device at said calling station operated, before any operation of said calling device thereat, for completing said circuit through only said finder portion of said connected finder-connector link, and means in said code-calling apparatus operated responsive to the completion of said circuit, by said operated manual means, for operating said automatic hunting switch to find and directly connect said code-calling apparatus with said calling line.

3. A telephone system such as claimed in claim 2 including means controlled responsive to said connection of said code-calling apparatus with said calling line for initiating the release of said one finder-connector link, whereby said connection between said calling line and said switching means one finder-connector link is subsequently severed.

4. In a telephone system, subscriber lines having stations thereon, means including a calling device individual to each of said stations and switching means common to said lines for extending connections between calling and called ones of said stations on said lines, means controlled responsive to the initiation of a call by a calling one of said stations for seizing and operating said switching means to connect said switching means with said calling line, code-calling equipment including a numerical responding switch and a non-numerical hunting switch, circuit means included in said connected common switching means for causing said code-call equipment to seize said calling line, manually operable means other than said calling device included in said circuit means and operated by said calling station for completing said circuit means, means responsive to said completion of said circuit means for operating said non-numerical hunting switch to find and connect said code-calling equipment with said calling line, means controlled responsive to said connection of said non-numerical hunting switch with said calling line for initiating the release of said switching means to sever said connection between said calling line and said switching means, individual different two-digit code-call numbers assigned to certain ones of said stations, means in said code-call equipment operated in response to the operation of said calling device by said calling subscriber when calling a certain one of said code-call numbers for transmitting trains of impulses representing said two digits of said called number, means controlled in response to receipt of each said train of impulses for separately operating said numerical responding switch, means for restoring said numerical switch to normal after each said operation, a first and a second group of storage relays, means controlled responsive to the first operation of said numerical switch for selecting and operating a relay in the first storage group, means controlled responsive to the second operation of said numerical switch for selecting and operating a relay in the second storage group, and a first and a second locking means operated respectively after said first and said second restorations of said numerical switch for maintaining said operated ones of said storage relays operated.

5. A telephone system such as claimed in claim 4 wherein said numerical switch includes a first and a second wiper each having access to a contact bank associated therewith, said first wiper and its associated contact bank providing the means whereby the certain first and second group storage relays, corresponding to said called code-call number, are selected for operation, means controlled responsive to said operation of said first group storage relay for applying a first marking on a certain contact of said second contact bank, control means for reoperating said numerical switch a third time and for transmitting a code signal corresponding to the first stored digit of the called code-call number, restoring means controlled responsive to said second wiper encountering said first marking on said second contact bank for restoring said numerical switch to normal, and means controlled responsive to said restoring of said numerical switch for removing said first marking on said second contact bank and for applying a second marking on a certain contact of said second contact bank, said control means again reoperating said numerical switch a fourth time and transmitting a code signal corresponding to the second stored digit of the called code-call number.

6. A telephone system such as claimed in claim 5 wherein said restoring means is controlled responsive to said second wiper encountering said second marking on said second contact bank for restoring said numerical switch to normal, means responsive to said last restoring of said numerical switch for removing said second marking from said second contact bank and for applying a third marking thereto, said control means then reoperating said numerical switch a fifth time for creating a silent interval between each cycle of the code signals, and means including said restoring means operated responsive to said second wiper encountering said third marking on said second contact bank for restoring said numerical switch to normal and for then applying said first marking to said second contact bank, whereby said code-calling equipment is prepared for transmitting another code signalling cycle.

References Cited in the file of this patent

UNITED STATES PATENTS

| | | |
|---|---|---|
| 1,480,241 | Clausen | Jan. 8, 1924 |
| 1,538,141 | Stevens | May 19, 1925 |
| 1,594,610 | Gardner | Aug. 3, 1926 |
| 1,888,337 | Voss | Nov. 22, 1932 |
| 2,149,646 | Voss | Mar. 7, 1939 |
| 2,332,966 | Erwin | Oct. 26, 1943 |

FOREIGN PATENTS

| | | |
|---|---|---|
| 580,264 | Germany | July 8, 1933 |
| 672,241 | Germany | Feb. 27, 1939 |